(12) United States Patent
Chun et al.

(10) Patent No.: US 7,831,819 B2
(45) Date of Patent: *Nov. 9, 2010

(54) FILTER MICRO-CODED ACCELERATOR

(75) Inventors: Anthony L. Chun, Los Altos, CA (US);
Lee Snyder, San Jose, CA (US); Ernest T. Tsui, Cupertino, CA (US); Siva Simanapalli, Santa Clara, CA (US);
Stephen S. Pawlowski, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1273 days.

This patent is subject to a terminal disclaimer.

(21) Appl. No.: 10/816,450

(22) Filed: Mar. 31, 2004

(65) Prior Publication Data

US 2005/0219251 A1 Oct. 6, 2005

(51) Int. Cl.
*G06F 9/00* (2006.01)
(52) U.S. Cl. .................................................. 712/245
(58) Field of Classification Search ................. 345/503; 712/245

See application file for complete search history.

(56) References Cited

U.S. PATENT DOCUMENTS

| 4,791,603 | A | * | 12/1988 | Henry | 326/38 |
| 4,862,407 | A | * | 8/1989 | Fette et al. | 712/35 |
| 6,081,888 | A | * | 6/2000 | Bell et al. | 712/248 |
| 6,725,364 | B1 | * | 4/2004 | Crabill | 712/227 |

OTHER PUBLICATIONS

Alsolaim et al.; "Architecture and Application of a Dynamically Reconfigurable Hardware Array for Future Mobile Communications Systems"; 2000; IEEE.*
Becker et al.; "DReAM: A Dynamically Reconfigurable Architecture for Future Mobile Communication Applications"; 2000; Springer-Verlag.*
Chun et al.; Application of the Intel Reconfigurable Communications Architecture to 802.11a, 3G and 4G Standards; 2004; IEEE.*

* cited by examiner

*Primary Examiner*—Alford W Kindred
*Assistant Examiner*—Benjamin P Geib
(74) *Attorney, Agent, or Firm*—Kacvinsky Daisak, PLLC (57) ABSTRACT

Method and apparatus for a filter micro-code accelerator are described.

22 Claims, 6 Drawing Sheets

FILTER MICRO-CODED ACCELERATOR

BACKGROUND

Computer systems typically use software, hardware, or a combination of both. Software based systems may operate by executing computer-readable instructions on general purpose hardware. Hardware based systems may comprise circuitry specially designed to perform specific operations, such as an application specific integrated circuit (ASIC). Hardware based systems typically have higher performance than software based systems, although they also lack the flexibility to perform tasks other than the specific tasks for which they were designed. Consequently, there may be need for improvements in computer systems that provide higher performance than software systems yet offer more flexibility than hardware systems.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DESCRIPTION OF SPECIFIC EMBODIMENTS

Numerous specific details may be set forth herein to provide a thorough understanding of the embodiments. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
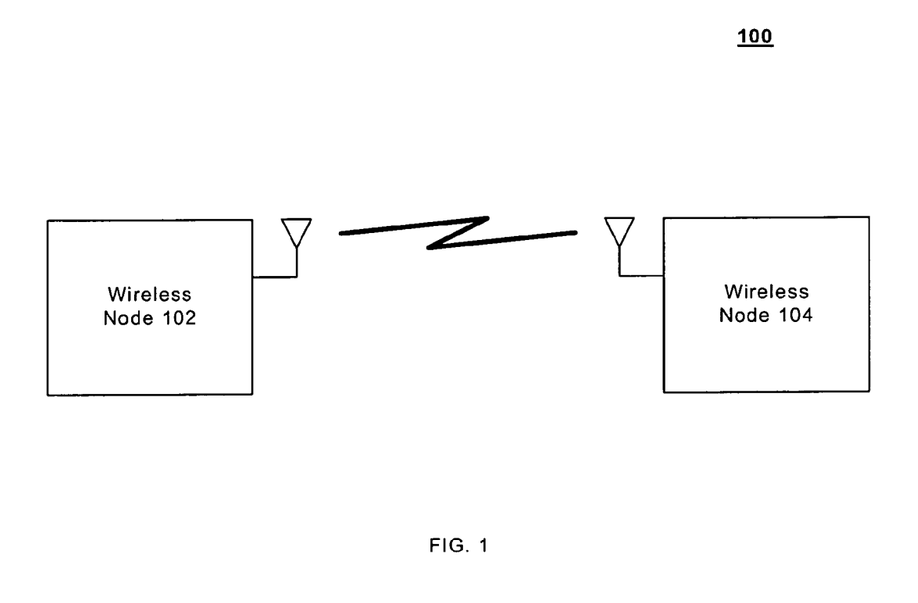
FIG. 1 illustrates a block diagram of a system 100 in accordance with one embodiment.

Referring now in detail to the drawings wherein like parts are designated by like reference numerals throughout, there is illustrated in FIG. 1 a system suitable for practicing one embodiment. FIG. 1 is a block diagram of a system 100. System 100 may comprise a plurality of nodes. The term "node" as used herein may refer any element, module, component, board, device or system that may process a signal representing information. The signal may be, for example, an electrical signal, optical signal, acoustical signal, chemical signal, and so forth. The embodiments are not limited in this context.

System 100 may comprise a plurality of nodes connected by varying types of communications media. The term "communications media" as used herein may refer to any medium capable of carrying information signals. Examples of communications media may include metal leads, semiconductor material, twisted-pair wire, co-axial cable, fiber optic, radio frequency (RF) spectrum, and so forth. The terms "connection" or "interconnection," and variations thereof, in this context may refer to physical connections and/or logical connections. The nodes may connect to the communications media using one or more input/output (I/O) adapters, such as a network interface card (NIC), for example. An I/O adapter may be configured to operate with any suitable technique for controlling communication signals between computer or network devices using a desired set of communications protocols, services and operating procedures, for example. The I/O adapter may also include the appropriate physical connectors to connect the I/O adapter with a suitable communications medium.

In one embodiment, for example, system 100 may be implemented as a wireless system having a plurality of nodes using RF spectrum to communicate information, such as a cellular or mobile system. In this case, one or more nodes shown in system 100 may further comprise the appropriate devices and interfaces to communicate information signals over the designated RF spectrum. Examples of such devices and interfaces may include omni-directional antennas and wireless RF transceivers. The embodiments are not limited in this context.

The nodes of system 100 may be configured to communicate different types of information. For example, one type of information may comprise "media information." Media information may refer to any data representing content meant for a user, such as data from a voice conversation, videoconference, streaming video, electronic mail ("email") message, voice mail message, alphanumeric symbols, graphics, image, video, text and so forth. Another type of information may comprise "control information." Control information may refer to any data representing commands, instructions or control words meant for an automated system. For example, control information may be used to route media information through a system, or instruct a node to process the media information in a predetermined manner. The embodiments are not limited in this context.

The nodes of system 100 may communicate the media or control information in accordance with one or more protocols. The term "protocol" as used herein may refer to a set of instructions to control how the information is communicated over the communications medium. The protocol may be defined by one or more protocol standards, such as the standards promulgated by the Internet Engineering Task Force (IETF), International Telecommunications Union (ITU), a company such as Intel® Corporation, and so forth.

shown in FIG. 1, system 100 may comprise a wireless communication system having a wireless node 102 and a wireless node 104. Wireless nodes 102 and 104 may comprise nodes configured to communicate information over a wireless communication medium, such as RF spectrum. Wireless nodes 102 and 104 may comprise any wireless device or system, such as mobile or cellular telephone, a computer equipped with a wireless access card or modem, a handheld client device such as a wireless personal digital assistant (PDA), a wireless access point, a base station, a mobile subscriber center, and so forth. In one embodiment, for example, wireless node 102 and/or wireless node 104 may comprise wireless devices developed in accordance with the Personal Internet Client Architecture (PCA) by Intel® Corporation. Although FIG. 1 shows a limited number of nodes, it can be appreciated that any number of nodes may be used in system 100. Further, although the embodiments may be illustrated in the context of a wireless system, the principles discussed herein may also be implemented in a wired communication system as well. The embodiments are not limited in this context.

Figure 2:
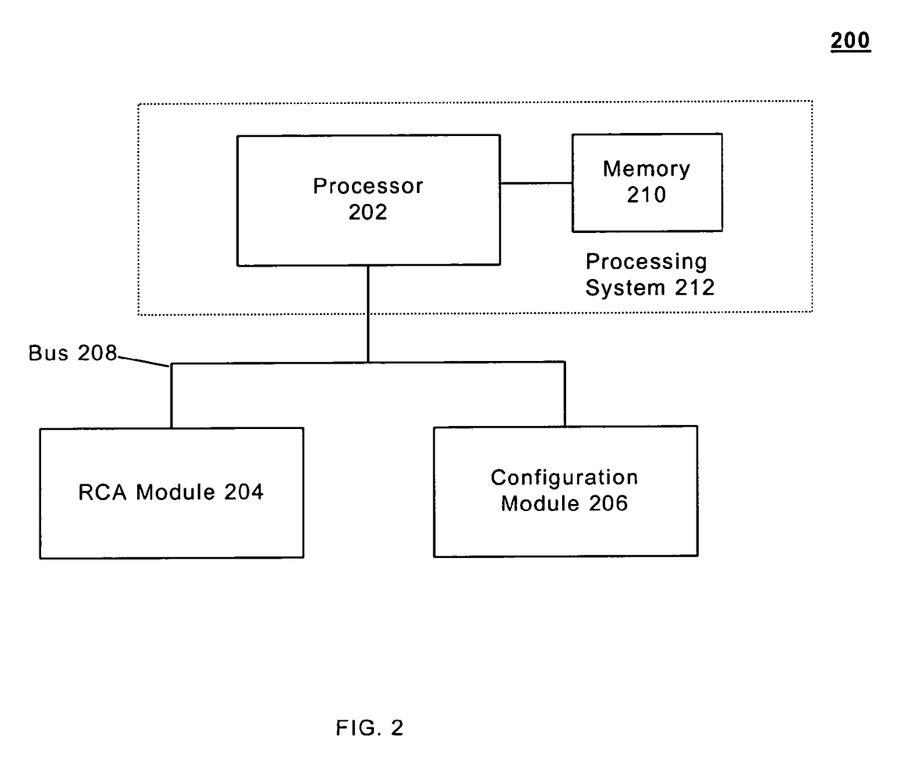
FIG. 2 illustrates a block diagram of a system 200 in accordance with one embodiment.

FIG. 2 illustrates a block diagram of a system 200 in accordance with one embodiment. System 200 may be implemented as part of, for example, wireless nodes 102 and/or 104. As shown in FIG. 2, system 200 may comprise a processing system 212, a reconfigurable communications architecture (RCA) module 204, and a configuration module 206, all connected via a communications bus 208. Processing system 212 may further comprise a processor 202 and a memory 210. Although FIG. 2 shows a limited number of modules, it can be appreciated that any number of modules may be used in system 200.

In one embodiment, processing system 212 may be any processing system on the host system, such as wireless nodes 102 and/or 104. Processing system 212 may comprise processor 202. Processor 202 may comprise any type of processor capable of providing the speed and functionality required by the embodiments of the invention. For example, processor 202 could be a processor made by Intel Corporation and others. Processor 202 may also comprise a digital signal processor (DSP) and accompanying architecture. Processor 202 may further comprise a dedicated processor such as a network processor, embedded processor, micro-controller, controller, input/output (I/O) processor (IOP), and so forth. The embodiments are not limited in this context.

In one embodiment, processing system 212 may comprise memory 210. Memory 210 may comprise a machine-readable medium and accompanying memory controllers or interfaces. The machine-readable medium may include any medium capable of storing instructions and data adapted to be executed by processor 202. Some examples of such media include, but are not limited to, read-only memory (ROM), random-access memory (RAM), programmable ROM, erasable programmable ROM, electronically erasable programmable ROM, dynamic RAM, double data rate (DDR) memory, dynamic RAM (DRAM), synchronous DRAM (SDRAM), embedded flash memory, and any other media that may store digital information.

In one embodiment, system 200 may comprise RCA module 204. RCA module 204 may be a reconfigurable system. A reconfigurable system may comprise a combination of hardware and software that may be configured to execute different types of applications. An example of a suitable reconfigurable system may be an RCA system as developed by Intel Corporation, for example.

Reconfigurable systems have resulted from an increasing demand for high-performance computing systems. For example, there is a growing demand for computing devices capable of handling multiple communications protocols. RCA module 204 may be reconfigurable thereby enabling a wireless node to switch seamlessly between any of a variety of communication protocols, such as IEEE 802.11, IEEE 802.16, General Packet Radio Service (GPRS), Enhanced GPRS (EGPRS), Bluetooth, Ultra Wideband (UWB), third generation cellular (3GPP) wideband code division multiple access (WCDMA) spread spectrum, fourth generation cellular (4G), ITU G.992.1 Asymmetrical Digital Subscriber Line (ADSL), ADSL2+, and so forth. The embodiments are not limited in this context.

The reconfigurable nature of RCA module 204 may provide several advantages. For example, RCA module 204 may be part of a wireless node (e.g., a laptop computer) that enables a user to maintain a continuous connection to the Internet or a virtual private network (VPN) as the user moves his laptop computer between a cable modem connection in his apartment, to a wireless local area network (WLAN) connection in his apartment complex, to a mobile connection while riding the train to work, to a local area network connection at his office. As another example, the ability to switch between a number of different communication protocols may be useful on a business trip, as a user moves between countries or regions that have adopted different communications standards. In another example, RCA module 204 may be upgradeable to implement future communication standards yet to be defined.

Reconfigurable systems represent a hybrid approach, in which software is used to reconfigure specially designed hardware to achieve performance approaching that offered by custom hardware. Reconfigurable systems also provide the flexibility of software-based systems, including the ability to adapt to new requirements, protocols, and standards. Thus, for example, a reconfigurable system could be used to efficiently process a variety of communications protocols, without the need for dedicated, ASIC-based DSPs for each protocol, resulting in savings in chip-size, cost, and/or power consumption.

In one embodiment, RCA module 204 may comprise multiple execution units used to perform complex calculations. The results generated by one execution unit may be used as input to other execution units, stored in memory, or sent to another processing system. Calculations can be divided among hardware elements, such that different parts of a calculation are assigned to the execution units upon which they are most efficiently carried out. For example, the physical layer processing performed by many wireless and wired communications systems often involves a combination of numerically intensive computations and somewhat less intensive, but more general-purpose, computations. This is particularly true of protocols that use packetized data where fast acquisition is often needed. For example, processing a 802.11a preamble typically entails fast preamble detection, fast automatic gain control (AGC) adjustment, and fast timing synchronization. These computations can advantageously be performed by processors that include a combination of data path execution units capable of efficiently performing the intensive numerical computations, and integer units capable of performing the general purpose computations. These operations may be executed in parallel to reduce latency and enhance overall system performance. In one embodiment, for example, RCA module 204 may be configured to perform various types of parallel processing techniques, such as single instruction multiple data (SIMD) parallel processing and multiple instruction multiple data (MIMD) parallel processing. The embodiments are not limited in this context.

In one embodiment, system 200 may comprise configuration module 206. Configuration module 206 may store and load configuration information to configure RCA module 204 to implement a given protocol. The configuration information may comprise, for example, various configuration parameters for RCA module 204. The type of configuration information is not limited in this context.

In general operation, system 200 may be initiated when power is applied to system 200. During the initialization process, processing system 212 may configure RCA module 204 using the configuration information stored as part of configuration module 206. RCA module 204 may then be ready to execute program instructions in accordance with the configuration information.

In one embodiment, the configuration of RCA module 204 may be modified to suit a particular set of program instructions. Such modifications can be made periodically or in accordance with an externally driven event. Examples of the latter may include receipt of explicit instructions to reconfigure RCA module 204 issued by a user, application, device, and so forth. The configurability of RCA module 204 may allow RCA module 204 to implement a particular wired or wireless protocol for a given application, and in some cases, may be reconfigurable on a function by function basis.

Figure 3:
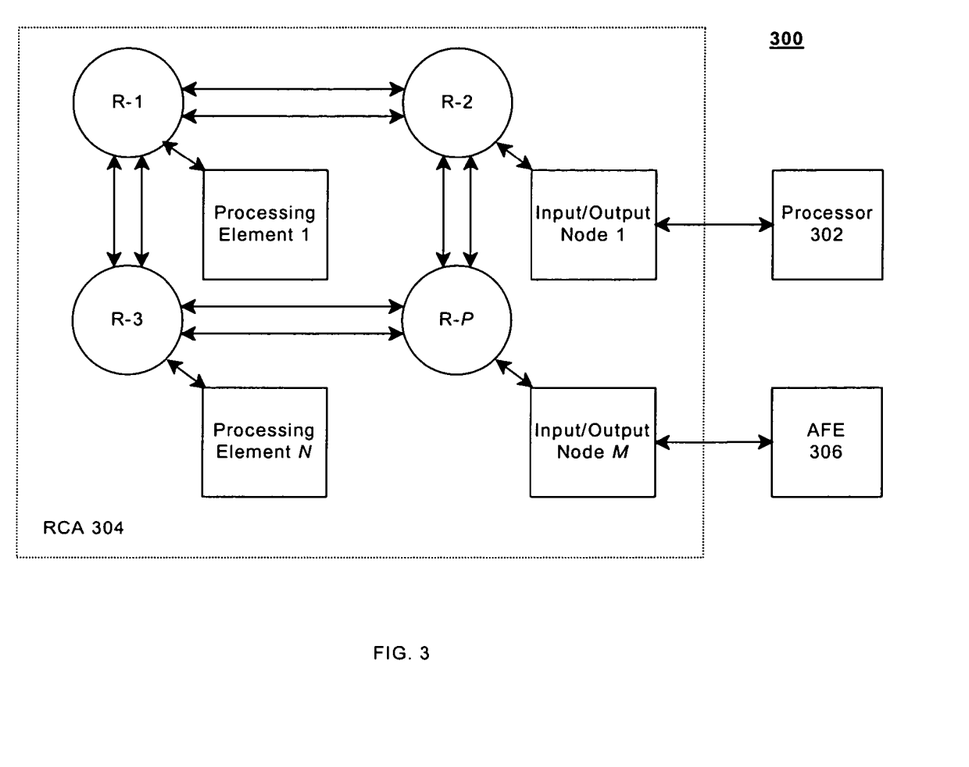
FIG. 3 illustrates a block diagram of a system 300 in accordance with one embodiment.

FIG. 3 illustrates a block diagram of a system 300 in accordance with one embodiment. System 300 may comprise a processor 302, an RCA module 304, and an analog front end (AFE) 306. Processor 302 and RCA module 304 may be representative of, for example, processor 202 and RCA module 204, respectively. As shown in FIG. 3, RCA module 304 may comprise multiple processing engines (PE) 1-N, multiple Input/Output (I/O) nodes 1-M, and multiple routing engines (R) 1-P, connected via communications mediums in a mesh topology. I/O nodes 1-M may be connected to various external devices, such as processor 302 and AFE 306. Although FIG. 3 shows a limited number of elements, it can be appreciated that any number of elements may be used in system 300.

In one embodiment, RCA 304 may form an infrastructure consisting of a heterogeneous array of flexible accelerators, data-driven control, and a mesh network for providing physical layer (PHY) and lower media access control (MAC) processing. RCA 304 may operate as the baseband (digital PHY layer) and lower MAC (data link layer) elements for a wireless device, such as a software defined radio (SDR), for example. The embodiments are not limited in this context.

In one embodiment, RCA 304 may comprise PE 1-N. PE 1-N may comprise a heterogeneous collection of "coarse" grained processing elements. Each PE is configurable to support multiple protocols, and may be designed to have an area and power approaching that of comparable dedicated hardware components. Each PE uses data-driven control that supports a desired level of reconfigurability and scalability parameters. PE 1-N may be connected in a relatively low latency mesh via routing elements R 1-M that enables the architecture to scale without potentially affecting previous instantiations.

In one embodiment, PE 1-N may be specially tailored to address generic communications applications. As such, PE 1-N may contain a relatively coarse granularity that is specifically addressing front end and back end processing functions, as well as miscellaneous general purpose operations. Although PE 1-N may each be designed to perform different operations, they all share a similar architectural approach that embraces SIMD and/or MIMD parallelism. In addition, they all have execution units that may be optimized through custom design to execute their intended functions while allowing some reasonable flexibility for parameter changes.

In one embodiment, one or more PE of PE 1-N may be implemented as a filter micro-coded accelerator (FMCA). A FMCA may be configured to perform computationally-intensive communications signal processing tasks. A FMCA may be configured to perform a variety of functions, such as operating as a resampling filter, digital filter, channel estimator, decimation filter, adaptive LMS equalizer, fast fourier transformer, frequency corrector, rake receiver, spread spectrum uplink and downlink spreader/despreader, preamble detector, transmit filter, and other DSP numerically intensive functions based on a multiply/accumulate structure. The embodiments are not limited in this context. Such a PE may be discussed in more detail with reference to FIG. 4.

In one embodiment, RCA 304 may comprise I/O nodes 1-M. I/O nodes 1-M may operate as an interface with various external devices, such as a processor 302. Processor 302 may comprise, for example, an embedded controller. I/O nodes 1-M may also interface with AFE 306. The embodiments are not limited in this context.

In one embodiment, system 300 may comprise one or more analog RF front end devices, such as AFE 306. For transmissions from wireless nodes 102 and/or 104, AFE 306 may convert digitized baseband samples to RF. Similarly, for received RF signals, AFE 306 may convert the RF band of interest to a digitized baseband. The embodiments are not limited in this context.

In general operation, processor 302 may provide overall control and supervision needed to download the necessary setup information into each PE 1-N and I/O node 1-M, plus any needed setup information for AFE 306. In addition to its control functions, processor 302 may provide the MAC layer functional operations. At each location in the mesh of PE 1-N is a data router (e.g., R 1-M), that is part of the mesh interconnect. Each PE 1-N is electrically connected to R 1-M. During initialization, processor 302 downloads configuration information and initial contents of data memories to each PE 1-N via the mesh interconnect using configuration data packets. Once all configuration information is downloaded and PE 1-N are initialized, processing operations may begin.

System 300 may perform a number of different functions, such as transmit and receive functions. When performing the transmit function, processor 302 delivers data to PE 1-N for PHY baseband processing. As baseband processing takes place, digitized samples are streamed to one or more AFE 306 for conversion to RF, then transmitted via an attached antenna. For the receive function, AFE 306 receives RF signals from the antenna, converts the RF signal to baseband, and delivers digitized samples to PE 1-N for digital baseband processing. Once processed, digital data is delivered to processor 302 for MAC layer processing.

Figure 4:
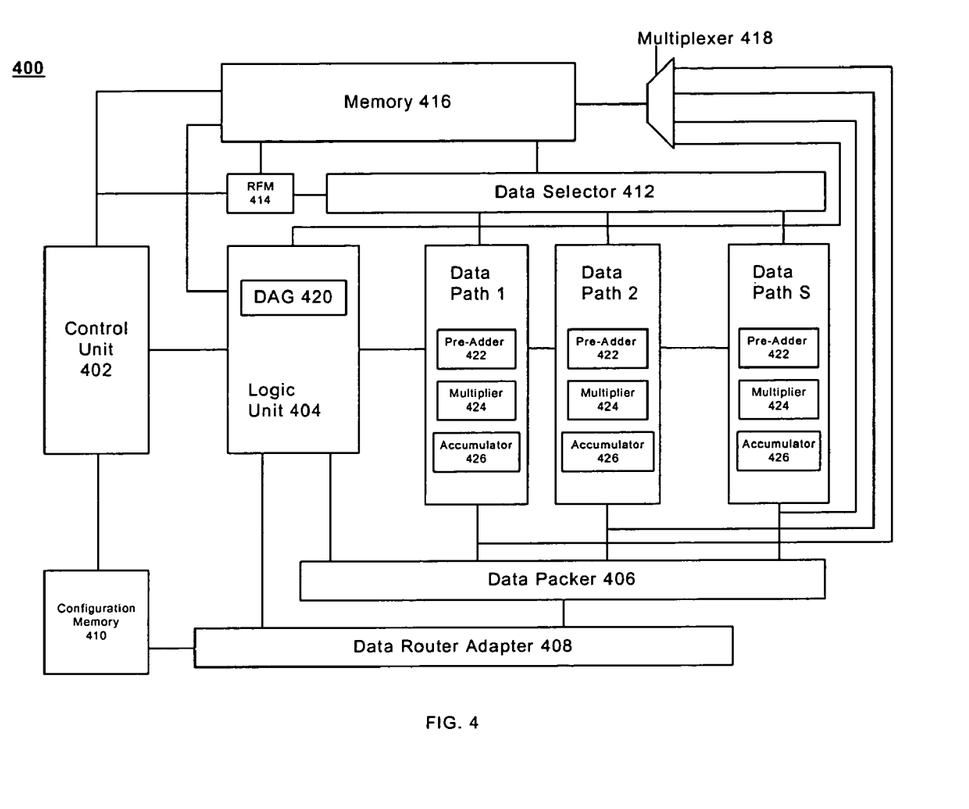
FIG. 4 illustrates a block diagram of a system 400 in accordance with one embodiment.

FIG. 4 illustrates a block diagram of a system 400 in accordance with one embodiment. System 400 may be representative of, for example, a PE such as PE 1-N of RCA 304. Alternatively, system 400 may be implemented as part of any processing system capable of having reconfigurable hardware and software elements. The embodiments are not limited in this context.

In one embodiment, system 400 may comprise a FMCA building block for RCA 304. FMCA 400 may be configured to perform computationally-intensive communications signal processing tasks for various communications protocols, such as IEEE 802.11, IEEE 802.16, GPRS, EGPRS, Bluetooth, UWB, 3GPP, WCDMA, 4G, ITU G.992.1 ADSL and ADSL2+, and so forth. The types of communication protocols implemented using system 400 are not limited in this context.

As shown in FIG. 4, FMCA 400 may comprise a control unit 402, a logic unit 404, data path execution units 1-N, data packer 406, data router adapter 408, configuration memory 410, data selector 412, register file module (RFM) 414, memory unit 416, and multiplexer (MUX) 418. Logic unit 404 may further comprise a data address generator (DAG) 420. Although FIG. 4 shows a limited number of elements, it can be appreciated that any number of elements may be used in FMCA 400.

In one embodiment, FMCA 400 may comprise data router adapter 408. Data router adapter 408 may operate as a PE-independent interface to an external data router, such as R 1-M. DRA 408 may receive data packets from a data router, buffers them, examines the packet header, and dispatches the packets based on packet type. For example, DRA 408 may send processing data packets to memory 416, and configuration and read request packets to configuration memory 410. DRA 408 may provide an output buffer to assemble data packets for transmission. When the output buffer contains a fully assembled packet, DRA 408 examines the header for the destination PE. If the destination PE is external, the packet is sent to the data router. If FMCA 400 is the destination PE, the packet can be sent directly to an input buffer as if the packet was received from an external PE, or be written back via the Z write port.

In one embodiment, FMCA 400 may comprise memory 416. Memory 416 may comprise a multi-ported data memory to store incoming data for processing (X data), coefficients and constants (Y data) and data generated by the Arithmetic Unit and Logic Unit (Z data). The ports on memory 416 may include the Z read for accessing data in memory, the W data write port for writing incoming data packets, X and Y read ports for reading data and coefficients during function execution, and the Z write port for storing configuration data prior to function execution and for writing data during execution by the execution units, such as logic unit 404 and data paths 1-S.

In one embodiment, FMCA 400 may comprise data selector 412. Data selector 412 receives X and Y data reads from memory 416 plus data from RFM 414, and distributes the data to the multiple data paths 1-S and logic unit inputs.

In one embodiment, FMCA 400 may comprise RFM 414. RFM 414 may be configured to store previously read X data during function execution when multiple read cycles are needed to provide data for calculations.

In one embodiment, FMCA 400 may comprise logic unit 404. Logic unit 404 may be configured to perform scalar arithmetic operations. Logic unit 404 may also supply triggered function identifiers to control unit 402, as well as register status signals for handling data dependent branching of control operations. A function identifier may be an identifier used to uniquely identify a function to be executed by the execution units. A triggered function identifier may comprise a function identifier for a function having sufficient input data to begin function execution by the execution units.

In one embodiment, logic unit 404 may also comprise DAG 420. DAG 420 may perform various addressing operations, such as generating write addresses for incoming data packets and read addresses for function execution.

In one embodiment, FMCA 400 may comprise a plurality of data path execution units, such as data paths 1-S. Data paths 1-S may comprise the main compute engines of FMCA 400. Data paths 1-S may be configured to perform various arithmetic operations. In one embodiment, for example, FMCA 400 may comprise eight data path execution units. Each data paths 1-S may comprise a multiply-accumulator (MACC) structure. Each MACC structure may comprise, for example, a pre-adder 422, multiplier 424 and accumulator 426. In this configuration, data paths 1-S may be capable of two complex multiplies or eight real multiplies per clock cycle.

In one embodiment, for example, FMCA 400 may comprise eight MACC structures (e.g., MACC 0-7). MACC 0-7 may each compute FFT butterflies. Further, MACC 0-7 may be interconnected to accommodate both real and complex operations. In one embodiment, for example, MACC 0 may receive data from MACC 1-4 for the purpose of accumulating results into a single number. MACC 2 may receive data from MACC 3 and 6 for data accumulation. For complex operations, the final real part may be accumulated in MACC 0 and the final imaginary part may be accumulated in MACC 2.

In one embodiment, the eight MACC structures allow at least two simultaneous complex multiplies. For the first complex product, MACC 0 and 1 produce the real part and MACC 2 and 3 produce the imaginary part. For the second complex product, MACC 4 and 5 produce the real part and MACC 6 and 7 produce the imaginary part. The real part of both complex products is summed in MACC 0 while the imaginary part of both complex products is summed in MACC 2. When performing real multiplications, 8 simultaneous products are produced. Often it is desirable to accumulate all 8 products into a single result. When this is the case, accumulator 426 of MACC 0 accumulates the final sum. The external inputs of the execution units, in addition to the data from memory 416, consist of the Add/Subtract Pre-Adder controls. The Pre-Adders for all of the MACCs each add four 16-bit numbers, for a total of 32 16-bit additions. Each 16-bit number is either added or subtracted according to the Add/Subtract controls from logic unit 404. This mode can be used for despreading a CDMA signal where the spreading code consists of ±1, for example.

In one embodiment, FMCA 400 may comprise control unit 402. Control unit 402 may control execution for logic unit 404 and data paths 1-S. Control unit 402 may have a function queue to store function identifiers. The function queue stores triggered function identifiers received from logic unit 404 for functions that have received sufficient data to start function execution. Control unit 402 may read the function identifiers one at a time, and generates function control signals (FCS) as necessary to perform the desired function on a clock-by-clock basis. The FCS may also be referred to herein as reconfigurator vectors. Control unit 402 may be discussed in further detail with reference to FIG. 5.

In one embodiment, FMCA 400 may comprise configuration memory 410. Configuration memory 410 may store configuration information for control unit 402. In one embodiment, for example, configuration memory 410 may store programmable logic array (PLA) configurations and look up table (LUT) configurations for a plurality of different protocols.

In one embodiment, FMCA 400 may comprise data packer 406. Data packer 406 may receive processed input data from logic unit 404 and data paths 1-S, selects the desired data, and outputs 32-bit words to a data router adapter 408 for transmit packet assembly.

In general operation, FMCA 400 may be used to implement functionality for any number of different communications protocols. A communications protocol is made up of a collection of system functions. Each function receives data, processes the data, and then outputs the data to the next function. RCA module 304 comprises an architecture to transport data packets between functions rather than between PE 1-N independent of the function mapping to PE 1-N. A set of RCA software tools may be used to analyze the system functions to a set of PE 1-N that comprise RCA module 304. Multiple system functions can be mapped to a single PE, such as FMCA 400.

As part of the mapping operation, the input of each function is allocated dedicated memory in memory 416 to receive input data. When sufficient input data has arrived for the function to begin execution, function execution may begin. This concept may be referred to herein as "data driven control" and distributes the control mechanism for initiating function execution across all processing elements rather than relying on a single point of control. As the function executes, output data destined for the next function is collected in an output buffer. Once an entire packet has been assembled, the packet is sent to the next function.

FMCA 400 may perform a number of different operations. In one embodiment, for example, FMCA 400 may be operable to receive packets, perform function execution, and transmit processed data in packets to other processing elements via the routing elements in a mesh network. The type and number of operations may vary according to a given configuration, and the embodiments are not limited in this context.

In one embodiment, FMCA 400 may perform a set of packet receive operations. For example, data router adapter 408 receives data packets from a routing element such as R 1-M. The header of the packet identifies the function and a specific input of the function that is to receive the data packet using a function identifier and input identifier, respectively. Each function input is allocated memory in memory 416 for buffering input data. DAG 420 allocates a write DAG and read DAG for the addressed input data buffer. As soon as there is sufficient data to begin executing the function, logic unit 404 sends the triggered function identifier to control unit 402. The packet receive operations are performed continuously and in parallel with function execution.

In one embodiment, FMCA 400 may perform a set of function execution operations. For example, function execution may start with control unit 402 reading a function identifier from the function queue. Control unit 402 begins executing the function by using the assigned read DAG. As data is read from memory 416, control unit 402 issues control signals on a clock-by-clock basis as necessary to logic unit 404 and data paths 1-S. The set of control signals, referred to herein as FCS, reconfigurator vectors, and/or "Micro-Code," determines how the data is processed by logic unit 404 and data paths 1-S.

In one embodiment, FMCA 400 may perform a set of transmit operations. For example, as outputs are generated by logic unit 404 and data paths 1-S, the processed input data is either written back to memory 416 via the Z port or to an output buffer for data router adapter 408. Data router adapter 408 may assemble one or more transmit data packets using the processed input data stored in the output buffer. Should the output buffer fill faster than packets are transmitted, function execution may be stalled until data router adapter 408 is able to transmit a data packet. Once the packet is fully assembled, as indicated by control unit 402, data router adapter 408 examines the packet header to determine the destination PE. If the destination PE is external, the packet is sent to the routing element for routing to the designated external PE.

Figure 5:
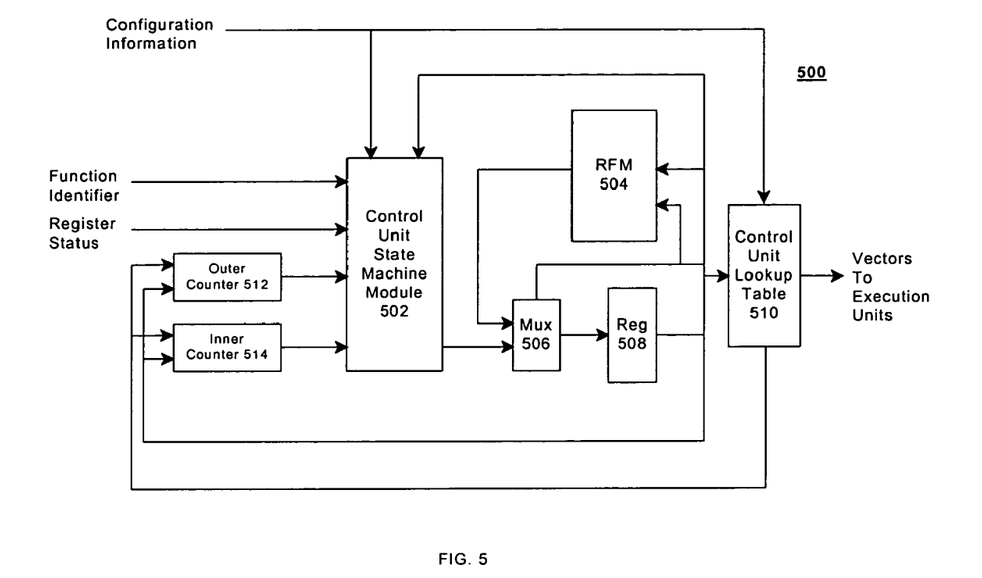
FIG. 5 illustrates a block diagram for a system 500 in accordance with one embodiment.

FIG. 5 illustrates a block diagram of a system 500 in accordance with one embodiment. System 500 may be representative of, for example, control unit 402. As shown in FIG. 5, control unit 500 may comprise a control unit state machine module (CUSMM) 502, a RFM 504, a MUX 506, a register (REG) 508, a control unit look up table (CULUT) 510, an outer loop counter 512, and an inner loop counter 514. Although FIG. 5 shows a limited number of elements, it can be appreciated that any number of elements may be used in control unit 500.

In one embodiment, control unit 500 may comprise outer loop counter 512. Outer loop counter 512 may be configured to count the number of repetitions of instructions in an outer loop for a function. Outer loop counter 512 may output an outer terminal count signal when completed. An example of an application that uses an outer loop may be the sliding of a convolution operation in a digital filter.

In one embodiment, control unit 500 may comprise inner loop counter 514. Inner loop counter 514 may be configured to count the number of repetitions of instructions in an inner loop for a function. Inner loop counter 514 may output an inner terminal count signal when completed. An example of an application that uses an inner loop may be the convolution operation in a digital filter.

In one embodiment, control unit 500 may comprise RFM 504. RFM 504 may be used to store the state of one function while another function is being executed. RFM 504 may maintain a current state index value for each function. The current state index value may represent the current state of a function. CUSMM 502 may return to executing the first function by restoring a state index value from RFM 504.

In one embodiment, control unit 500 comprises a CUSMM 502. CUSMM 502 may implement a state machine for control unit 500. CUSMM 502 may receive the following inputs: (1) current state index value (e.g., from REG 508); (2) current function identifier to represent the current function to be executed (e.g., from logic unit 404); (3) status register values for the execution units (e.g., from logic unit 404); (4) outer terminal count signal (e.g., from outer loop counter 512); and (5) inner terminal count signal (e.g., from inner loop counter 514). CUSMM 502 may use the inputs to generate an address referred to herein as the operation number. The operation number may be output to CULUT 510. CUSMM 502 may also output the next state of the state machine.

In one embodiment, CUSMM 502 may receive a current state index value. The current state index value may consist of several components as described in Table 1 below:

TABLE 1

| State Component | Number of Bits | Description |
| --- | --- | --- |
| Operation Number | 8 | The operation number may comprise a unique number assigned by the compiler to identify a specific combination of FCS. |
| Count | 4 | When multiple instances of one operation number occurs within a signal function, the Count component distinguishes one instance from the others. |
| State Identifier | 8 | A number used to identify which state is being executed, such as: (1) idle; (2) low power idle; (3) function 1; (4) function 2; and (5) function S. |

Once CUSMM 502 receives the various inputs, CUSMM 502 may generate a next state index value. The next state index value may be similar in structure to the current state index value, as described in Table 1. The next state index value may include an operation number for the next state of the state table. The operation number may be used by CULUT 510 to look up the appropriate reconfigurator vector, as described further below.

In one embodiment, CUSMM 502 may output a number of external state machine signals. An example of external state machine signals may be described in Table 2 below:

TABLE 2

| Signal | Number of Bits | Input/Output | Description |
| --- | --- | --- | --- |
| Save | 1 | Output | A single bit control used to write the current state to the register file. |
| Restore | 1 | Output | A single bit control used to read a previously saved state from the register file. |
| Register ID | 4 | Output | Used to specify the register to be read or written. |

TABLE 2-continued

| Signal | Number of Bits | Input/ Output | Description |
|---|---|---|---|
| Function Read | 1 | Output | A single bit control used to read the next triggered function ID from the function queue. |
| Outer Counter Load | 1 | Output | A control bit used to load the counter with a new value. |
| Outer Counter Enable | 1 | Output | A control bit that enables the counter to count down to the next value. |
| Inner Counter Load | 1 | Output | A control bit used to load the counter with a new value. |
| Inner Counter Enable | 1 | Output | A control bit that enables the counter to count down to the next value. |
| Register Status | 8 | Input | Register status signals from the logic unit. |
| Function ID | 8 | Input | Function ID from function queue. |
| Outer Terminal Count | 1 | Input | A bit from the outer loop counter indicating whether the counter has counted down to zero. |
| Inner Terminal Count | 1 | Input | A bit from the inner loop counter indicating whether the counter has counted down to zero. |

In one embodiment, control unit 500 may comprise CULUT 510. CULUT 510 may receive the operation number from CUSMM 502. CULUT 510 may use the operation number to search a list of reconfigurator vectors to configure the execution units of FMCA 400. Once a reconfigurator vector corresponding to the operation number is found, the reconfigurator vector may be sent to the execution units of FMCA 400 to configure the appropriate hardware elements.

In general operation, control unit 500 may issue FCS or reconfigurator vectors on a clock-by-clock basis as necessary to logic unit 404 and data paths 1-S in order to execute the current function. A function is executed by performing an ordered list of operations on data reads from memory 416. Control unit 500 multiplexes between multiple functions. As the current function changes, control unit 500 switches from one list of operations to another list of operations. Some functions, like filtering, may require a relatively straightforward list of sequential operations, such as with outer and inner operation loops, no branching and a single point of entry into the list of operations. Other functions may require branching within the function and have multiple points of entry, where it is necessary to save the current state of processing from one execution of the function to the next execution. Branching is based on status signals of registers received from logic unit 404.

Operations for the above systems may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, although the given programming logic may be described herein as being implemented in the above-referenced modules, it can be appreciated that the programming logic may be implemented anywhere within the system and still fall within the scope of the embodiments.

Figure 6:
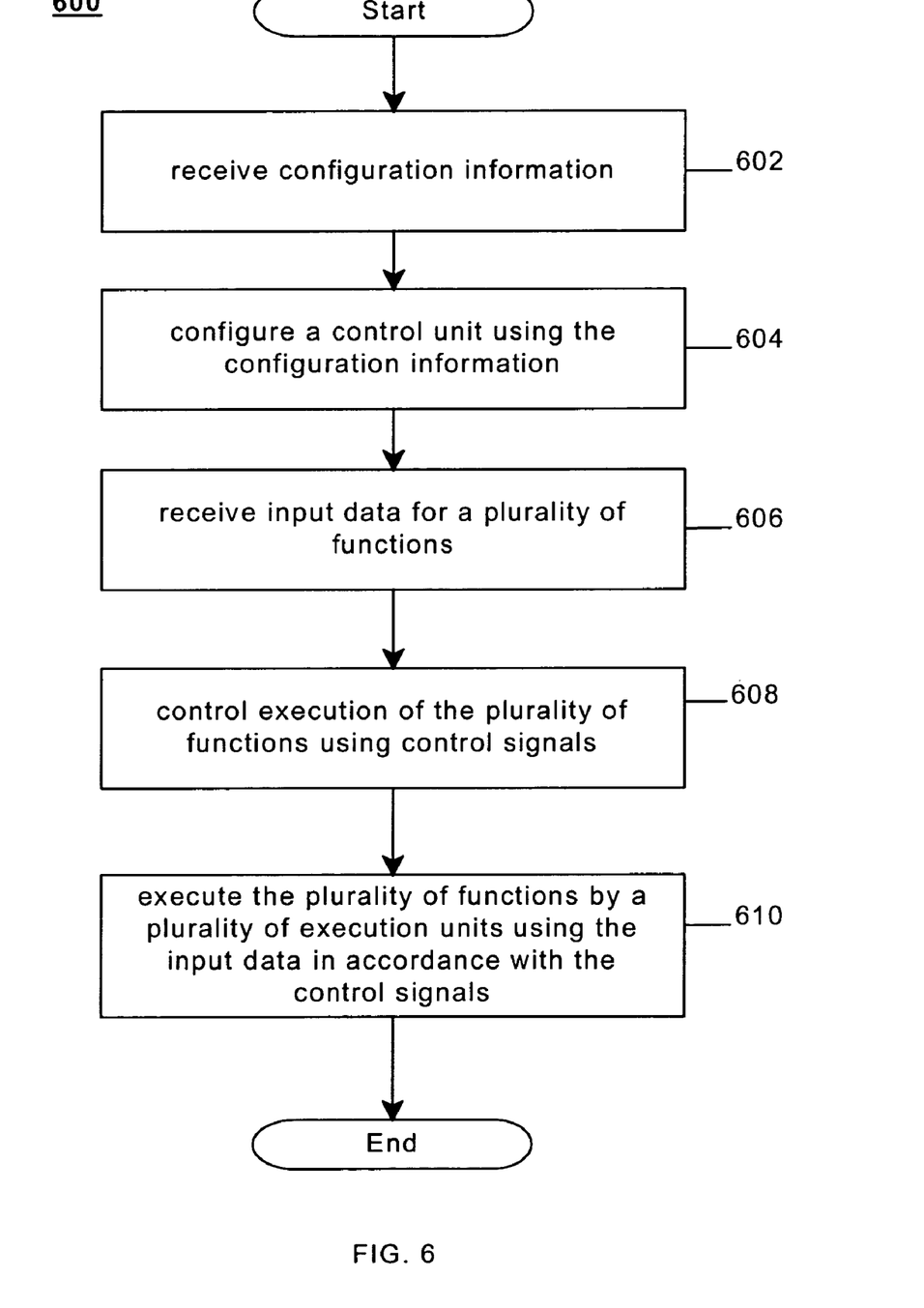
FIG. 6 illustrates a block flow diagram for processing logic 600 in accordance with one embodiment.

FIG. 6 illustrates a block flow diagram for a programming logic 600 in accordance with one embodiment. FIG. 6 illustrates a programming logic 600 that may be representative of the operations executed by a FMCA in accordance with one embodiment. As shown in programming logic 600, configuration information may be received at block 602. A control unit may be configured using the configuration information at block 604. Input data for a plurality of functions may be received at block 606. Execution of the plurality of functions may be controlled using control signals at block 608. The plurality of functions may be executed by a plurality of execution units using the input data in accordance with the control signals at block 610. In one embodiment, for example, the plurality of functions may be executed during different time periods.

In one embodiment, the control unit may be configured using configuration information. Configuration parameters for the control unit may be received. The configuration parameters may include, for example, a fuse map and table content data. A control unit state machine module may be configured using the fuse map. A control unit look up table may be configured using the table content data.

In one embodiment, the control unit may control execution of the functions by execution units. A function identifier for a function may be received from a list of function identifiers. A reconfigurator vector may be generated using the function identifier. A data select signal may be sent to a data selector to select input data read from an input buffer in accordance with the reconfigurator vector. Function control signals may be sent to the execution units to process the input data in accordance with the reconfigurator vector.

In one embodiment, the control unit may generate a reconfigurator vector. For example, a control unit state machine may receive various inputs, such as an inner terminal count signal, an outer terminal count signal, a function identifier, a current state index value, and status register values. An operation number address may be generated using the inputs. The operation number address may be converted to a reconfigurator vector, with the reconfigurator vector to control execution of the function by the execution units.

In one embodiment, the execution units may execute a function. The execution units may receive input data for a function from a memory. The execution units may also receive function control signals from the control unit. The execution units may process the received input data in accordance with the function control signals.

In one embodiment, the control unit may receive configuration information. The configuration information may include a function identifier and an input identifier for each function. Alternatively, the function identifier and input identifier may be retrieved from a received data packet. An input buffer corresponding to each input identifier may be created. Input data for each function may be written into the corresponding input buffer.

Portions of the embodiments may be implemented using an architecture that may vary in accordance with any number of factors, such as desired computational rate, power levels, heat tolerances, processing cycle budget, input data rates, output data rates, memory resources, data bus speeds and other performance constraints. For example, a portion of one embodiment may be implemented using software executed by a processor, as described previously. In another example, one embodiment may be implemented as dedicated hardware, such as an ASIC, Programmable Logic Device (PLD) or DSP and accompanying hardware structures. In yet another example, one embodiment may be implemented by any combination of programmed general-purpose computer components and custom hardware components. The embodiments are not limited in this context.

The embodiments may have been described in terms of one or more modules. Although an embodiment has been described in terms of "modules" to facilitate description, one or more circuits, components, registers, processors, software subroutines, or any combination thereof could be substituted for one, several, or all of the modules. The embodiments are not limited in this context.

While certain features of the embodiments have been illustrated as described herein, many modifications, substitutions, changes and equivalents will now occur to those skilled in the art. It is, therefore, to be understood that the appended claims are intended to cover all such modifications and changes as fall within the true spirit of the embodiments.

The invention claimed is:

1. An apparatus, comprising:
a memory unit to store input data for a plurality of functions, wherein each function comprises a computationally intensive communications signal processing task;
a control unit having a control unit state machine module configured with a fuse map to control execution of said plurality of functions, said control unit to select a function to execute using a function identifier, wherein said control unit comprises said control unit state machine module to be configured in accordance with said fuse map, said control unit state machine to output an operation number address, and a control unit lookup table to be configured with said table content data;
a configuration memory to store configuration parameters for said control unit, said configuration parameters including said fuse map and table content data; and
a plurality of execution units operatively responsive to said control unit, said execution units to receive input data from said memory unit, and use said input data to execute a function corresponding to said function identifier.

2. The apparatus of claim 1, wherein said execution units comprise a logic unit to perform scalar arithmetic operations, and at least one data path execution unit to perform arithmetic operations.

3. The apparatus of claim 2, wherein said logic unit comprises a data address generator to control writing said input data to said memory unit, and reading said input data from said memory unit.

4. The apparatus of claim 1, wherein
said control unit lookup table to convert said operation number address to a reconfigurator vector, said reconfigurator vector to control execution of said function by said execution units.

5. The apparatus of claim 4, wherein said control unit further comprises:
an inner loop counter to count a number of repetitions of instructions in an inner loop, said inner loop counter to output an inner terminal count signal;
an outer loop counter to count a number of repetitions of instructions in an outer loop, said outer loop counter to output an outer terminal count signal; and
a register file module to store a state for one function while another function is being executed by said execution units.

6. The apparatus of claim 5, wherein said control unit state machine module receives as inputs said inner terminal count signal, said outer terminal count signal, said function identifier, a current state index value, and status register values from said execution units, and uses said inputs to generate said operation number address.

7. The apparatus of claim 1, further comprising a data selector to read said input data from said memory unit, and distribute said input data to said execution units.

8. The apparatus of claim 1, further comprising a register file module to store previously read input data during function execution when multiple read cycles are needed to provide data for said function.

9. The apparatus of claim 1, further comprising a data packer to receive processed input data from said execution units, and to send said processed input data to an output buffer.

10. The apparatus of claim 1, further comprising a data router adapter to communicate packets with said routing elements, said data router adapter to distribute data from received packets to said configuration memory or said memory unit, and transmit packets of processed data from said execution units stored in an output buffer.

11. A method, comprising:
receiving configuration parameters for a control unit, said configuration parameters including a fuse map and table content data;
configuring said control unit having a control unit state machine module with said configuration parameters, wherein said configuring comprises configuring said control unit state machine module using said fuse map, and configuring a control unit lookup table using said table content data;
receiving input data for a plurality of functions, wherein each function comprises a computationally intensive communications signal processing task;
controlling execution of said plurality of functions using control signals; and
executing said plurality of functions by a plurality of execution units using said input data in accordance with said control signals.

12. The method of claim 11, wherein said plurality of functions are executed during different time periods.

13. The method of claim 11, wherein said controlling comprises:
reading a function identifier for a function from a function list;
generating a reconfigurator vector using said function identifier;
sending a data select signal to a data selector to read input data from an input buffer in accordance with said reconfigurator vector; and
sending function control signals to said execution units to process said input data in accordance with said reconfigurator vector.

14. The method of claim 13, wherein said generating comprises:
receiving as inputs an inner terminal count signal, an outer terminal count signal, said function identifier, a current state index value, and status register values from said execution units, at said control unit state machine;
generating an operation number address using said inputs; and
converting said operation number address to a reconfigurator vector, said reconfigurator vector to control execution of said function by said execution units.

15. The method of claim 11, wherein said executing comprises:
receiving said input data at said execution units;
receiving function control signals from said control unit; and
processing said received input data in accordance with said function control signals.

16. The method of claim 11, wherein said receiving comprises:
  receiving a function identifier and an input identifier for each function;
  creating an input buffer corresponding to each input identifier; and
  writing input data for each function in said corresponding input buffer.

17. An article comprising:
  a storage medium;
  said storage medium including stored instructions that, when executed by a processor, result in receiving configuration parameters for a control unit, said configuration parameters including a fuse map and table content data, configuring said control unit having a control unit state machine module with said configuration parameters, receiving input data for a plurality of functions, wherein each function comprises a computationally intensive communications signal processing task, controlling execution of said plurality of functions using control signals, and executing said plurality of functions by a plurality of execution units using said input data in accordance with said control signals, wherein the stored instructions, when executed by a processor, further result in said configuring by configuring said control unit state machine module using said fuse map, and configuring a control unit lookup table using said table content data.

18. The article of claim 17, wherein the stored instructions, when executed by a processor, further result in said plurality of functions being executed during different time periods.

19. The article of claim 17, wherein the stored instructions, when executed by a processor, further result in said controlling by reading a function identifier for a function from a function list, generating a reconfigurator vector using said function identifier, sending a data select signal to a data selector to read input data from an input buffer in accordance with said reconfigurator vector, and sending function control signals to said execution units to process said input data in accordance with said reconfigurator vector.

20. The article of claim 19, wherein the stored instructions, when executed by a processor, further result in said generating by receiving as inputs an inner terminal count signal, an outer terminal count signal, said function identifier, a current state index value, and status register values from said execution units, at said control unit state machine, generating an operation number address using said inputs, converting said operation number address to a reconfigurator vector, said reconfigurator vector to control execution of said function by said execution units.

21. The article of claim 17, wherein the stored instructions, when executed by a processor, further result in said executing by receiving said input data at said execution units, receiving function control signals from said control unit, and processing said received input data in accordance with said function control signals.

22. The article of claim 17, wherein the stored instructions, when executed by a processor, further result in said receiving by receiving a function identifier and an input identifier for each function, creating an input buffer corresponding to each input identifier, and writing input data for each function in said corresponding input buffer.

* * * * *